INVENTOR
ARMINDO CANTARUTTI

BY *Oberlin, Maky & Donnelly*

ATTORNEYS

United States Patent Office 3,523,854
Patented Aug. 11, 1970

3,523,854
APPARATUS FOR APPLYING STRIP TREAD ON TIRE BUILDING DRUM
Armindo Cantarutti, Akron, Ohio, assignor, by mesne assignments, to NRM Corporation, Akron, Ohio, a corporation of Ohio
Filed Sept. 26, 1966, Ser. No. 582,125
Int. Cl. B29h 17/20
U.S. Cl. 156—397                    15 Claims

ABSTRACT OF THE DISCLOSURE

An apparatus for applying strip tread on a tire building drum. The apparatus comprises an assembly including a distributor belt, a stitcher wheel, and a system of convex pulleys. The assembly is supported on a powered screw parallel to the axis of the tire building drum, the screw on rotation causing the assembly to traverse the face of the drum. Stock from a relatively stationary source is caused to make at least one 90° turn by the system of convex pulleys from a first direction of movement into alignment with the distributor belt. The stock then passes through the nip between the stitcher and the face of the drum.

---

The present invention relates generally as indicated to apparatus for applying strip tread on a tire building drum and more particularly to an apparatus which helically wraps a strip of rubber-like material of, say, 3/16" to 1/4" thickness and 3/4" to 3" width to build up a desired side wall and tread contour on the fabric plies previously wrapped on the drum.

It is a prevalent practice in the art of building tire carcasses to extrude tread stock and to manually apply one end of a precut length thereof on the last fabric ply on the tire building drum and to rotate the drum one revolution to wrap the tread stock on the drum. If such wrapping results in a gap at the ends of the tread stock, the operator of the tire building machine will pull off part of the length of the tread stock and stretch it to form a closed butt joint. Likewise, if the tread stock was pulled excessively during wrapping so that the ends are overlapped, the operator will similarly peel back part of the length of the tread stock and crowd the same so that the ends will meet in a closed butt joint. As evident, both of these practices results in variation in the wall thickness of the tread stock circumferentially around the tire carcass, that is, thinning of the stretched portion of the tread stock or thickening of the crowded portion of the tread stock. Moreover, in the practice of applying tread stock in slab form there are occasions wherein air is trapped in pockets between the tread stock and the underlying ply stock particularly if the operator has neglected to properly perform the tread stitching operation or if the tread stock is yet hot and sticky when applied on the tire building drum. When the carcass is shaped and cured, any such trapped air pockets will prevent the tread stock from tightly bonding to the underlying ply stock. Obviously, any such tires with unbonded areas between the tread and underlying ply stock are unfit for use.

Accordingly, it is a principal object of this invention to provide an apparatus for applying the tread or the tread and side walls in the form of a relatively thin strip helically around the drum, the lead of the helix being varied to build up the desired contour of the side walls and tread. The strip tread used for this purpose may be a calendered material but irrespective of this, the helical winding of the strip permits escape of air from any tiny helical gaps between the strip and the underlying ply layer as the carcass is shaped and cured thus to eliminate trapped air pockets and to obtain uniform strong bonding of the underlying ply stock and the tread and side walls.

It is another object of this invention to provide apparatus of the character indicated having a strip distributor conveyor that travels axially of the tire building drum at a variable rate of speed to build up the desired tread and side wall contour.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principle of the invention may be employed.

Figure 1:
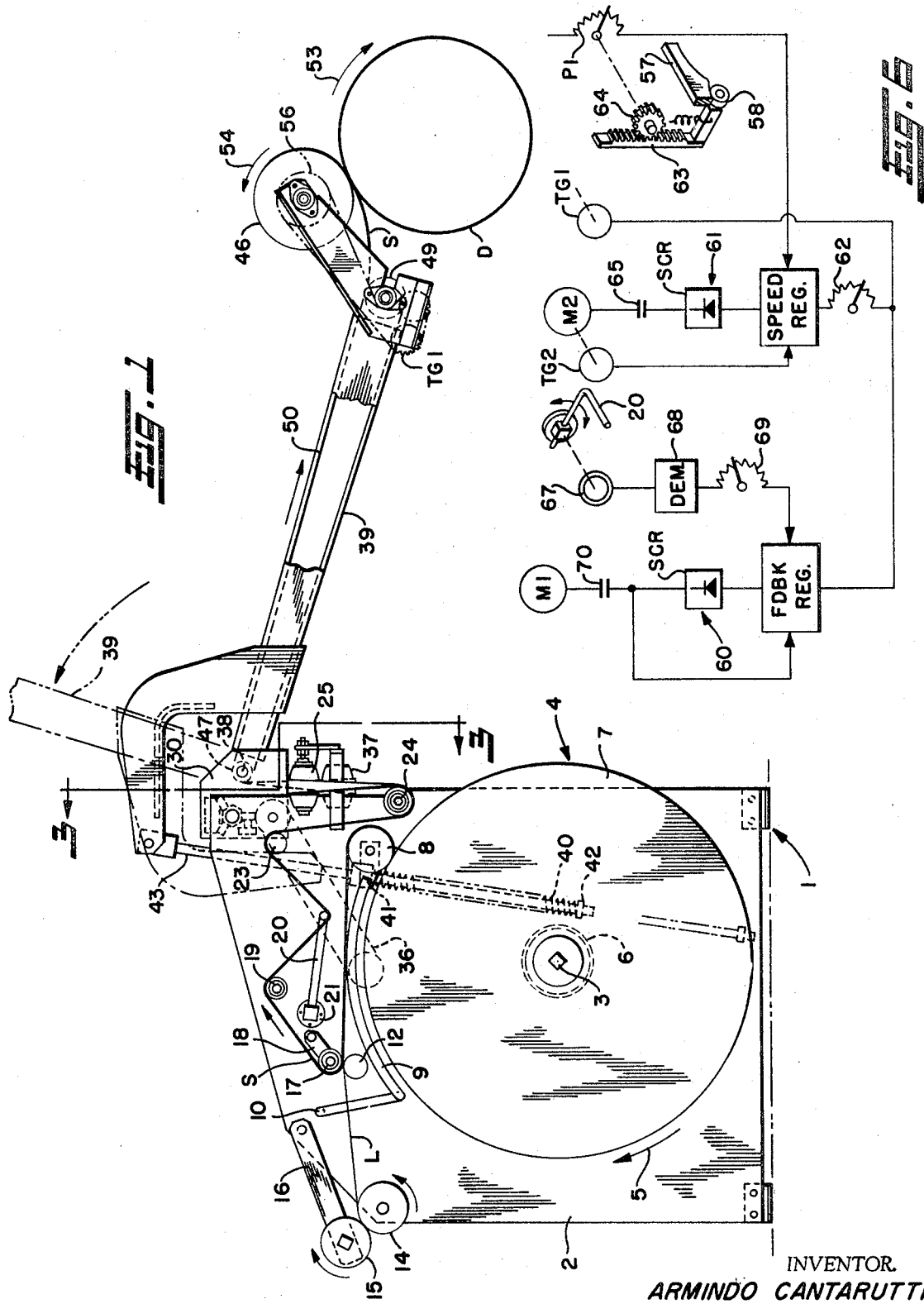
FIG. 1 is a side elevation view of an apparatus embodying the present invention.

FIGS. 5a, 5b, and 5c are radial cross-section views showing how the strip tread builds up the desired tread contour on the tire carcass being constructed on a tire building drum; and FIG. 6 is a schematic wiring diagram for control of the lineal speed of the strip tread as applied on the rotating tire building drum and for control of the rate of axial advance of the strip distributor conveyor.

Referring now more particularly to the drawings, the apparatus herein shown comprises a frame 1 having a vertical plate 2 on the rotatable square shaft 3 of which a stock roll 4 is removably supported for rotation in the direction of the arrow 5. The stock roll 4 has spirally coiled about the hub 6 and between the flanges 7 thereof the strip tread S and the liner L as of polyethylene or the like. Movable between the flanges 7 of the roll 4 is a roller 8 which is mounted on an arm 9 pivoted at 10 so as to remain in engagement with the outer convolution of the stock S and liner L.

To the rear of the plate 2 there is secured a drive motor M1 which through the chain and sprocket drive 11 drives a pull roll 12 and a liner drive roll 14 which drives the liner takeup roll 15, the latter being mounted on the end of a pivoted arm 16 to achieve frictional driving of roll 15 through the liner L. The strip tread S and liner L are frictionally engaged between the pull roll 12 and the roll 17 thereabove which is mounted on the end of a swingable arm 18 and the strip tread S passes over a roll 19, under a dancer arm 20 pivoted at 21, over another roll 23 and thence under yet another roll 24, the three rolls 19, 23, and 24 just mentioned being rotatably mounted on the vertical plate 2. Also fixed with respect to the vertical plate is a roll 25 whose axis is perpendicular to the axes of said rolls 19, 23, and 24 whereby the strip tread S is twisted 90° as clearly shown in FIGS. 1 and 3.

Figure 2:
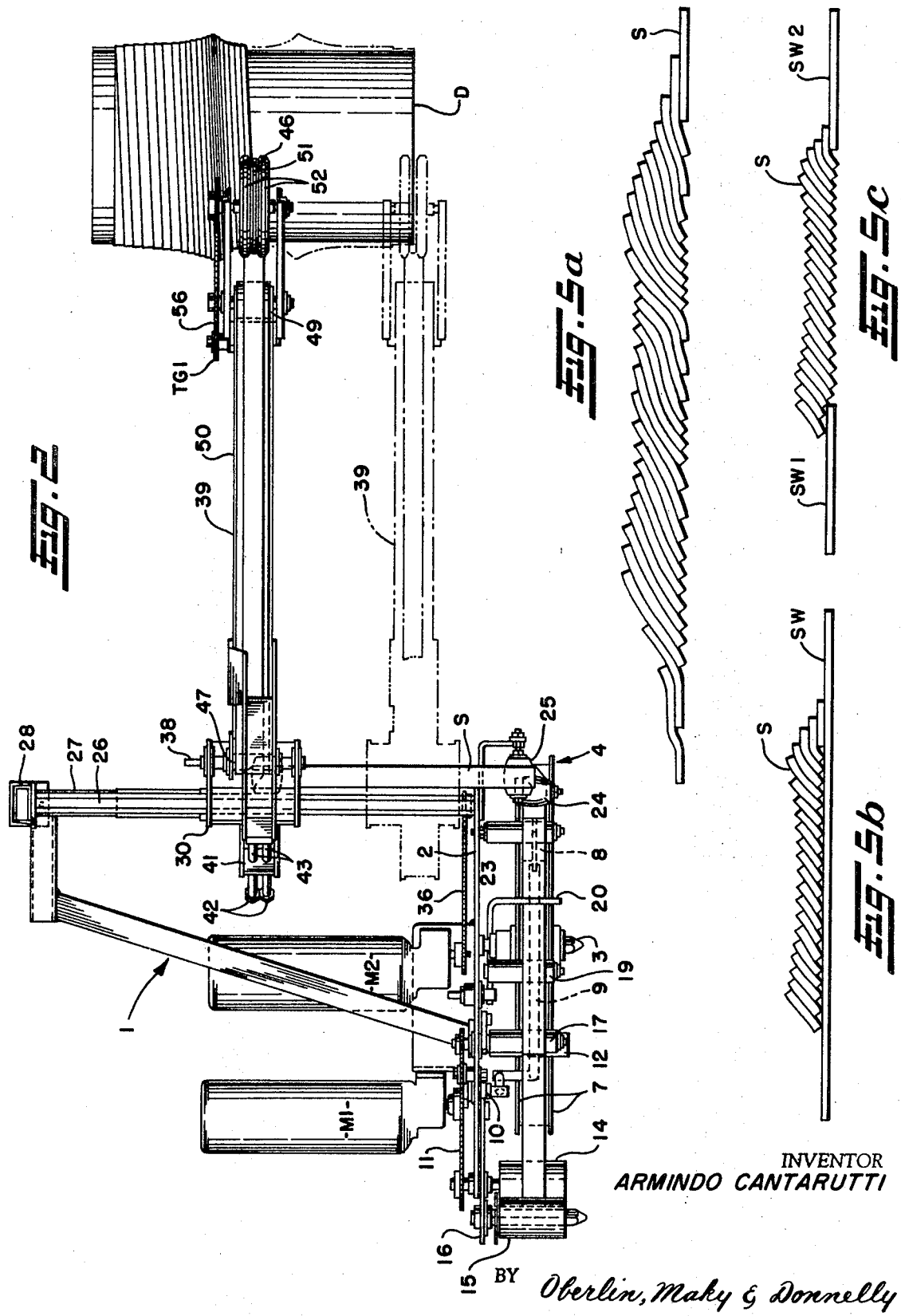
FIG. 2 is a top plan view as viewed downwardly from the top of FIG. 1.
Figure 3:
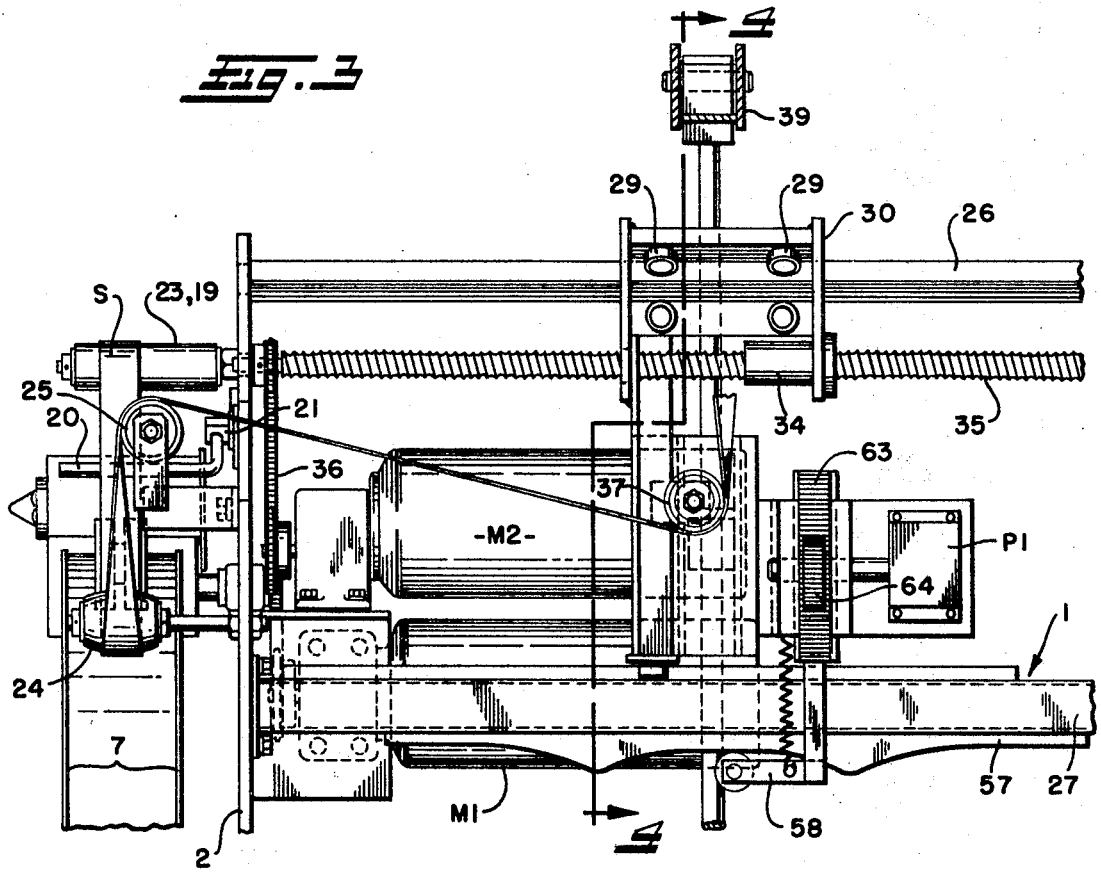
FIG. 3 is a fragmentary cross-section view on enlarged scale taken substantially along the line 3—3, FIG. 1.
Figure 4:
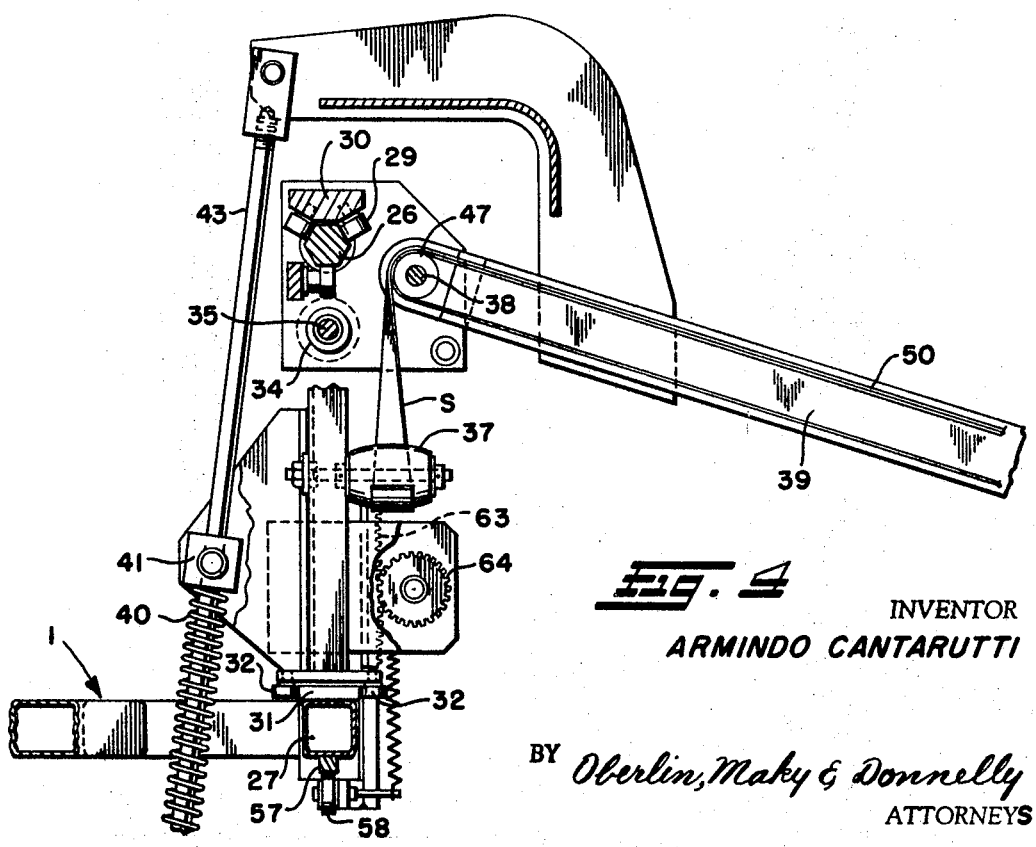
FIG. 4 is a fragmentary cross-section view taken substantially along the line 4—4, FIG. 3.

The frame 1 behind plate 2 comprises upper and lower horizontal members 26 and 27 of which the upper member 26 is a hex bar or the like which is rotatably supported at its ends on the vertical plate 2 and on the vertical frame member 28, said hex bar being engaged by the rollers 29 of a longitudinally movably mounted carriage 30. The lower member 27 provides a longitudinally extending track 31 for the rollers 32 on said carriage 30. The carriage 30 is provided with a nut 34 which is engaged with the threads of the feed screw 35 which extends horizontally and has its ends journalled in bearings in the vertical plate 2 and in vertical frame member 28 respectively. The feed screw 35 is turned by the electric drive motor M2 and the chain and sprocket drive 36 as shown in FIGS. 2 and 3. Said carriage 30 has a forwardly projecting roll 37 which is rotatable about an axis parallel to the fixed roll 25 so that the strip tread S is engaged thereunder as best shown in FIGS. 3 and 4.

Pivotally mounted on the carriage 30 at 38 is a distributor conveyor unit 39. When the distributor unit 39 is not in use, it may be swung to the dot-dash position shown in FIG. 1, and held in that position by the springs 40 compressed between the swivel guides 41 and the adjustable nuts 42 threaded on a pair of rods 43 which extend downwardly from the upper arm 45 of the distributor unit 39, said rods 43 being longitudinally slidable in swivel guides 41. The nuts 42 may be adjusted so that when the distributor unit 39 is in the operating position shown in FIG. 1, the stitcher wheel 46 at the end of the distributor unit 39 will apply desired pressure on the strip tread S to cause wrapping thereof around the drum D.

The distributor unit 39 comprises a pulley 47 at the pivot 38 and a pulley 49 at the other end over which passes the endless belt 50 and, as evident, the strip tread S is again twisted 90° in passing from the roll 37 to the conveyor belt 50.

The stitcher wheel 46 aforesaid preferably comprises, as best shown in FIG. 2, a steel or like wheel 51 of smaller diameter than the adjacent polyurethane or like deformable wheels 52, the deformable wheels 52 being operative to press on the strip tread S as it is being wrapped around the drum and if the strip tread S is applied at an angle as it is in the thicker portions as shown in FIGS. 5a, 5b, and 5c, the yieldable portions 52 will be deformed to apply pressure on the strip tread S and the intermediate wheel 51, likewise, will firmly bear on the strip S as it is being applied.

When the leading end of the strip tread S is applied on the last ply stock layer on the drum D, the rotation of the drum D in the direction of arrow 53 will drive the stitcher wheel 46 in the direction of arrow 54. Through the chain and sprocket drive 56, the belt drive pulley 49 will be driven at a speed corresponding to the lineal speed of the strip S as it is being applied on the drum D. The chain drive 56 also drives a tachometer generator TG1 and as will be seen, the drive motor M1 speed will be varied to pull the stock S and L from the stock roll 3 at the desired lineal speed. As the dancer arm 20 moves up and down, the speed of the motor M1 will be increased and decreased slightly.

In the building of a tire carcass a plurality of layers of ply stock (not shown) are wrapped around the drum D and the ends of the ply stock are wrapped around wire beads (not shown) placed at the ends of the drum D and as a final operation, the tread and side wall is applied. As shown in FIG. 2, the distributor unit 39 is travelling downwardly as the drum D rotates. As evident, where the side wall is relatively thin, the helix angle is fairly great and as the desired contour builds up in thickness the helix angle is decreased and increased. Such variation in lead or helix angle is achieved by varying the speed of the drive motor M2 for the feed screw. The lower frame member 27 may have detachably mounted thereon a cam 57 having a cam surface corresponding to the desired contour of build up of strip tread S on the drum D and engaged with said cam 57 is a cam follower 58 which operates a precision linear potentiometer P1.

Although there may be a minute helical air space between the strip tread S and the underlying ply stock on drum D, as evident in FIGS. 5a, 5b, and 5c, the air is readily vented through said helical air space (and through the superimposed layers of the strip S especially when the strip is cold calendered material) and through the vents in the vulcanizing mold to assure tight bonding of the thread and side wall stock to the underlying ply stock layer uniformly around the entire finished tire. Moreover, the strip tread S is applied at substantially constant tension and stitching pressure.

The electrical control mechanism for the strip tread applicator essentially comprises regulator type servomechanisms as shown in FIG. 6.

In operation, it is necessary to control the lineal speed of the strip S from the stock roll 4 to the drum D to correspond with the peripheral speed of the drum D. Similarly it is also necessary to control the rate of rotation of the feed screw 35 as a function of both the peripheral speed of the drum D and the thickness of strip S desired to be wound on the drum D at various locations along its length in order to build up the desired contour of the tread.

To effect each of these operations, servomechanism units 60 and 61 are respectively provided to control the rate of rotation of the linear and pull roll drive motor M1 and the power feed screw drive motor M2. Each of these systems is referenced to a voltage derived from a tachometer generator TG1 driven through the chain drive 56 from the stitcher wheel 46 which in turn is driven by frictional contact with the strip S as it is applied on drum D. Each of the units 60 and 61 comprises an SCR power control which converts the AC voltage from the power lines to a voltage to drive the respective motors M1 and M2, such voltage being a function of control elements, and regulated in a particular manner to be described in more detail hereinafter.

The servo control 61 of the distributor unit 39 will be first described. By controlling the advance of the power feed screw 35 any desired tread contour can be built up on the periphery of the drum D. The tachometer generator TG1 driven by the stitcher wheel 46 provides a DC voltage output whose amplitude is proportional to the rate of rotation of the stitcher wheel 46 and thus to the lineal speed of the strip S being applied to the drum D. Although DC voltages are referred to in the description of operation of portions of this system it will be understood by those skilled in the art that AC systems could be employed as well with suitable modifications. A portion of the reference voltage is picked off by a recalibration potentiometer 62 and is applied as one input to the adder portion of the servomechanism unit 61. A second input to the adder portion is a DC voltage derived from a tachometer feedback generator TG2 coupled to the output shaft of the feed screw drive motor M2. The feed back signal is thus a voltage proportional to the rate of rotation of the drive motor M2 and when combined with the reference signal provides an error signal for the SCR power unit. The error signal controls the conduction interval of the SCR's and provides an output voltage sufficient to run the drive motor M2 at a desired speed. By suitable adjustment of the recalibration potentiometer 62 and the proportion of combination of the feedback and reference signals an operating speed of the feed screw motor M2 may be obtained which is commensurate with the rate of rotation of the drum D and which provides the desired translation of the distributor unit 39 to apply a constant thickness of material on the drum D. In order to vary the thickness of strip S being applied to the drum D so as to build up a desired contour it is necessary to either slow down or speed up the translation of the distributor unit 39 while the rate of rotation of the drum D remains substantially constant.

In order to provide this function, the cam 57 profile causes the cam follower 58 which is carried by the distributor unit 39 to move up and down as the distributor unit 39 undergoes its translation. The movement of the cam follower 58 is converted to rotary motion through a rack 63 and pinion 64 drive to turn the precision linear potentiometer P1. The potentiometer P1 then picks off a portion of a suitable DC voltage source applied to it and provides a modifier signal, which is a DC level of amplitude proportional to the height of the cam profile and which is then combined in the adder portion of the servomechanism unit 62. In effect, the modifier signal adds to or subtracts from the reference signal to change the speed of rotation of the feed screw motor M2. Thus the signals are so phased that when the cam follower 58 rides up on a high portion of the cam 57, the modifier signal is reduced in amplitude to therefore reduce the reference voltage and thus the voltage applied to the drive motor M2, thereby slowing down the rate of translation of the distributor unit 39. Conversely, when a low portion of the cam profile is encounted by the cam follower, the potentiometer P1 will be rotated to a position where a greater modifier signal is provided which adds to the reference signal causing an increased voltage to be applied to the feed screw motor M2 and causing an increased rate of translation of the distributor unit 39 and thus a thinner layer of material to be applied to the drum D. Thus we may say that the rate of rotation of the feed screw motor M2 is a function of the reference and modifier signals and is maintained at any desired speed by the motor tachometer feedback loop. A contact 65 of an automatic run relay (not shown) is provided between the SCR power unit and the drive motor M2 to interrupt the drive of the distributor unit 39 when the drum D is not undergoing rotation. Similarly, reversing contacts may be employed to return the distributor unit 39 to its starting point since it is usual to lay the strip tread S in only one direction.

The operation of the liner 14 and pull roll 12 drive motor servomechanism system 60 provides a precise measure of control over the pull roll 12 to maintain the requisite lineal speed of strip S available for the distributor unit 39. The same reference signal from the tachometer generator TG1 on the stitcher wheel 46 is utilized as a reference signal to this servomechanism system 60 in order to provide desired speed of rotation for the pull roll 12. One difference in this control system 60 is that the feedback loop is closed only about the SCR power unit thereby providing a regulated voltage for application to the drive motor M1. A dancer arm 20 monitors the length of a loop in the strip tread S and is utilized to provide a signal for modifying the speed of the liner and pull roll drive motor M1. As the loop of strip tread S changes length due to an increase or decrease of required material for the distributor unit 39, the angular position of the dancer arm will correspondingly be changed. Such angular deviation is coupled directly to the rotor of a synchro generator 67 which in turn provides an output signal altered in phase or amplitude and which corresponds to the angular position of the rotor of the synchro. This AC signal is then converted in a demodulator 68 to a DC signal, a portion of which is picked off by the loop position potentiometer 69 to provide a modifier signal for application to the adder portion of the servomechanism.

Thus, the drive motor M1 rotates at a speed proportional to the voltage developed by the stitcher wheel driven tachometer generator TG1 and modified by the dancer arm 20 to pull stock from the stock roll 3 and maintain an optimum sized loop in the strip tread S. It is thus seen that when the loop tends to shorten due to an increased requirement for material a larger modifier signal will be generated and added to the reference signal to cause an increased voltage to be applied to the servo-mechanism 60 thereby rotating the drive motor M1 at an increased speed. Such increased speed will cause the strip tread S to be pulled off faster from the stock roll 3, thereby allowing the loop at dancer arm 20 to elongate to its optimum length. The converse, of course, takes place when the loop is too long wherein the drive motor M1 will be slowed down to supply a lesser amount of material thereby shortening the loop to its optimum length. A contact 70 is similarly employed between the SCR power unit and the drive motor M1 to prevent operation of the motor M1 under idle conditions.

When different diameter winding drums are employed it will be seen that the stitcher wheel 46 will rotate at a correspondingly different speed since it is driven from the periphery of the drum, and a different reference voltage will be supplied. Since this changed voltage is applied directly to the servomechanism 60 for the liner and pull roll drive motor, it will automatically change the rate of rotation of the drive motor M1 to the speed which is required to supply this different quantity of material. Since the dancer arm 20 is dependent only on the length of the loop, the automatic control of the stock pulloff mechanism will be maintained.

The changed reference signal applied to the servo system 61 for the power feed screw 35 will cause a different correlation between rate of translation of the distributor assembly and rate of rotation of the drum D, and this must be compensated for by adjusting the recalibration potentiometer 62. Similarly, the modifier signal may also have to be adjusted as by a potentiometer (not shown) or by variations in the cam 57 profile to attain the proper quantity of material at built up portions of the tread profile.

Thus it can be seen that in operation the distributor unit 39 requires a constantly changing quantity of material since the assembly is undergoing translation as well as laying material on different diameters on the drum when the thread is being built up. The liner and pull roll drive motor M1 servo system 60 automatically compensates for these variations and maintains the proper tension in the strip tread S.

Similarly it is an easy matter to change the profile of the tread and side wall simply by substituting a different cam 57. In FIG. 5a, the strip S constitutes the side wall and tread portions whereas in FIG. 5b, the strip S is wrapped around a wide side wall strip SW to define the tread portion, and in FIG. 5c, the strip S is wrapped around the ply layer on the drum D and overlaps the edge portions of spaced-apart side wall strips SW1 and SW2.

Other modes of applying the principle of the invention may be employed, change being made as regards the details described, provided the features stated in any of the following claims, or the equivalent of such, be employed.

I therefore particularly point out and distinctly claim as my invention:

1. Apparatus for applying a flexible rubber-like strip on a rotating tire building drum to constitute the tread portion of a tire carcass comprising a frame structure, guide means supported by said frame structure generally parallel to the axis of the tire building drum; means on said frame structure to feed said strip so that it has a first direction of movement in a plane generally parallel to the axis of the drum; an assembly including an endless belt distributor conveyor oriented generally perpendicular to the axis of the drum; a first drive means to effect longitudinal movement of said assembly along said guide means; second drive means to drive said distributor conveyor to lineally feed such strip towards the tire building drum, said two drive means effecting a helical winding of such strip on the drum; said assembly including roller means over which the strip travels to effect at least one turn of the strip from said first direction of movement into a direction for lineal travel on said distributor conveyor, and means for varying the speed of said drive means to vary the radial thickness of buildup of the strip axially along the drum to conform with the desired contour of the tread portion of the tire carcass.

2. The apparatus of claim 1 wherein said assembly includes a stitcher wheel driven by the strip as it is being wound on the drum, means operatively connecting said stitcher wheel to the conveyor to drive the latter.

3. The apparatus of claim 1 wherein said assembly includes a transversely movable carriage engaging said guide means, said conveyor being pivotally mounted on said carriage for upward swinging away from the drum.

4. The apparatus of claim 3 wherein said conveyor has at the end nearest the drum a stitcher wheel operative to press the strip against the drum as the strip is being wound on the drum.

5. The apparatus of claim 4 further including means operatively connecting the stitcher wheel to the conveyor to drive the latter.

6. The apparatus of claim 4 wherein said conveyor has a stitcher wheel to press the strip against the drum as the strip is wound on the drum; said stitcher wheel having a yieldable peripheral portion to press the strip against the drum and against the convolution of strip therebeneath.

7. The apparatus of claim 1 in which said endless belt extends close to the periphery of the tire building drum.

8. The apparatus of claim 1 further including a stock roll oriented so as to deliver the strip in a plane generally perpendicular to the axis of the drum, and additional roller means to receive the strip and effect a turn of the strip into said first direction of movement.

9. The apparatus of claim 1 including a feed means comprising a relatively fixed support means for feeding said strip in a substantially fixed plane generally perpendicular to the axis of the drum, the apparatus further including means to effect an additional turn of the strip from the direction of feed to the plane substantially parallel to the axis of the tire building drum.

10. Apparatus for applying a flexible rubber-like strip on a rotating tire building drum to constitute the tread portion of a tire carcass comprising a frame structure; a stock roll rotatable on said frame structure having such strip coiled thereabout; a pull roll and drive means therefor on said frame structure for unwinding such strip from said stock roll, said strip having a first direction of movement in a plane generally parallel to the axis of the drum; an assembly including an endless belt distributor conveyor, said conveyor being oriented generally in a direction at right angles to the axis of the drum; a drive support means mounted on said frame structure, said drive support means moving said assembly transversely in a direction generally parallel to the axis of the drum to effect helical winding of such strip on the drum; means for varying the transverse speed of said drive means to vary the radial thickness of build up of the strip axially along the drum to conform with the desired contour of the tread portion of the tire carcass; said assembly further including means to receive said strip from said pull roll and to effect at least one turn from said first direction of movement to the orientation of said distributor conveyor.

11. The apparatus of claim 10 wherein said assembly includes a stitcher wheel driven by the strip as it is being wound on the drum, means operatively connecting said stitcher wheel to the conveyor to drive the latter.

12. Apparatus for applying a flexible rubber-like strip on a rotary tire building drum to constitute the tread portion of a tire carcass comprising a frame structure including a vertical front plate and rearwardly extending parallel guide members generally parallel to the axis of the tire building drum; a stock roll rotatable on said vertical plate having such strip coiled therearound; a pull roll and drive means therefor on said plate for unwinding such strip from said stock roll; an assembly including a distributor conveyor oriented generally perpendicular to the axis of the drum, said assembly being movable longitudinally along said guide members and having first and second drive means respectively to lineally feed such strip toward the drum and to longitudinally move said conveyor along said guide members to effect helical winding of such strip on the drum; said plate having a first set of rollers thereon over which the strip travels lineally in a direction generally parallel to the lineal travel of the strip on said conveyor; and said frame structure and assembly having additional rollers over which the strip makes a first ninety degree turn and travels lineally in a direction generally parallel to the movement of said conveyor along said guide members, and makes a second ninety degree turn for travel lineally on said distributor conveyor.

13. The apparatus of claim 12 wherein said first drive means for said conveyor comprises a stitcher wheel driven by the strip as it is being wound on the drum, including means operatively connecting said stitcher wheel to said distributor conveyor.

14. The apparatus of claim 12 wherein said conveyor comprises an endless belt on which the strip is lineally moved toward the drum; and wherein said conveyor at the end nearest the drum has a stitcher wheel operative to press the strip against the drum as the strip is being wound on the drum.

15. The apparatus of claim 12 wherein said conveyor has a stitcher wheel to press the strip against the drum as the strip is wound on the drum; said stitcher wheel having a yieldable peripheral portion to press the strip against the drum and against the convolution of strip therebeneath.

References Cited

UNITED STATES PATENTS

| | | | |
|---|---|---|---|
| 2,855,976 | 10/1958 | Jeannero et al. | 156—460 |
| Re. 25,349 | 3/1963 | Hanson | 156—397 XR |
| 3,223,572 | 12/1965 | Holloway et al. | 156—397 XR |
| 3,251,722 | 5/1966 | Holman | 156—397 XR |
| 3,418,191 | 12/1968 | Dieckmann et al. | 156—397 |

SAMUEL F. FEINBERG, Primary Examiner

S. C. BENTLEY, Assistant Examiner